Oct. 17, 1961  M. J. E. GOLAY  3,005,044
AUTOMATIC TERRAIN MAPPING SYSTEM
Filed March 27, 1947
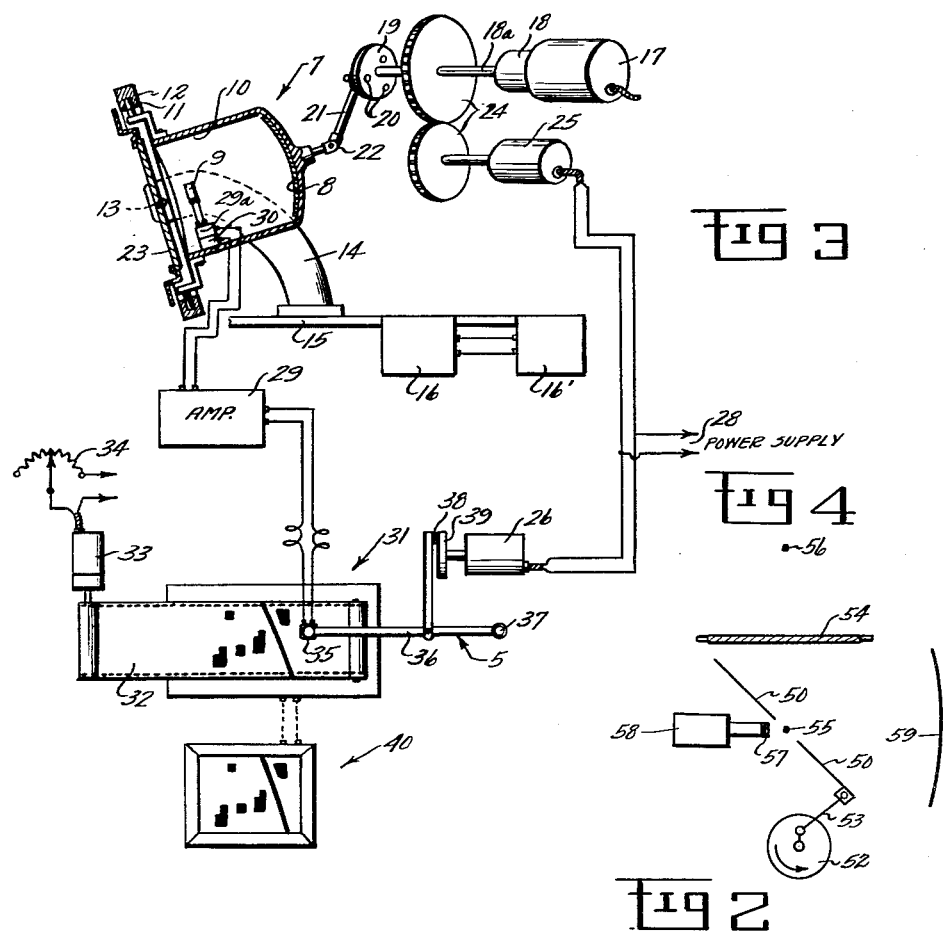
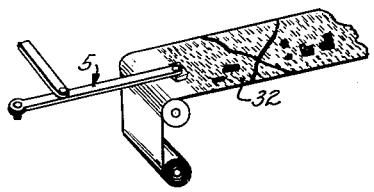
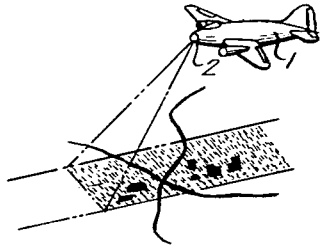
INVENTOR.
MARCEL J.E. GOLAY
BY
HIS ATTORNEYS United States Patent Office 3,005,044
Patented Oct. 17, 1961

3,005,044
AUTOMATIC TERRAIN MAPPING SYSTEM
Marcel J. E. Golay, 372 Hollywood Ave., West End, N.J.
Filed Mar. 27, 1947, Ser. No. 737,687
5 Claims. (Cl. 178—6.6)
(Granted under Title 35, U.S. Code (1952), sec. 266)

The invention described herein may be manufactured and used by or for the Government for governmental purposes without payment to me of any royalty thereon.

This invention relates to an automatic mapper and a method of mapping terrain therewith from an airplane. The map is of that class of devices which is sensitive to radiations transmitted from the ground. Such radiations may be either infra-red rays (which are preferred for use) or they may be visible radiations (light), ultra-violet radiations or any other type of electromagnetic radiations, for example, reflected radar waves. The device must be modified according to the class of radiations it is desired to receive.

Among the military uses of such a device are:

(a) To permit navigation of bomb-carrying airplanes under conditions of poor or no visibility, to a desired target area by referring to a previously recorded survey map or photographic strip-map;

(b) To furnish information as to the location of enemy targets on the ground such as steel works and oil refineries, both of which radiate infra-red rays to a marked degree. This information can later be used in the form of a strip-map or map-like presentation, to furnish data to direct the flight of guided missiles, bombing planes or the like.

In the drawings:

FIG. 1 is a perspective view of an airplane carrying a radiation detector which is part of my invention, for scanning the ground surface at substantially right angles to the direction of flight;

FIG. 2 is a perspective view showing the strip which may result from the scanning of the terrain shown in FIG. 1. FIG. 2 shows conventionally the driving mechanism, the printing stylus and the paper strip on which the map-like presentation is to be made;

FIG. 3 is a diagram showing the general organization of one form (infra-red sensitive) of detector, scanner and recorder. From it persons skilled in the art will be able to adapt it to other forms of radiation; and FIG. 4 is a diagrammatic illustration of an alternative scanning system in which all parts are fixed except a flat scanning mirror and the driving members therefor.

The operation of guided missiles which are controlled by electromagnetic radiations emitted by target areas such as visible or infra-red radiations require a previous knowledge of the amount of such target radiations as compared with the radiations of the background. This is particularly necessary in case of infra-red radiations which cannot be seen by the naked eye. Most of the objects at normal temperatures emit radiations of a spectral distribution with a maximum near 10 microns in wave length. The atmospheric transmission permits radiations from 8 to 15 microns to pass with relatively small attenuation so that objects may be observed at ranges of several miles. This is therefore considered as a practical spectral range for operation of controlling device for guided missiles. These radiations are present both day and night, although their relative values may be different, for example, on a clear night, watercourses may be warmer than land areas, while at daytime the land areas are generally warmer. The automatic mapper disclosed was initially conceived with the objective of mapping target area with regard to radiations in this spectral region. However, the same principles of operation would apply to other spectral regions, for example, it is possible to produce a map in accordance to visual appearance by using light-sensitive instead of heat-sensitive detecting elements. Ordinary autogenerating photocells may be used. For ultra-violet radiation detection exclusively, a photocell sensitive only to the ultra-violet band would be used.

FIG. 1 illustrates the general principle of operation of the automatic mapper. It shows airplane 1 carrying the radiation detector 2 as described in connection with FIG. 3. This detector scans the ground surface in a direction substantially at right angles to the direction of flight.

The method involved in the operation shown in FIG. 1 is to scan the terrain to be mapped with a scanning head which operates from side to side and is located on substantially the longitudinal axis of the airplane. The advancing component of a scanning motion is furnished by the airplane itself through its flight progress. It is evident that if the scanning head travels from side to side in a predetermined path which is continuously advanced by the flight of the airplane, then the shape of the scanned terrain will be that of a strip of indefinite length. The flight path of the airplane should be as parallel as may be to the strip of terrain being scanned.

FIG. 2 illustrates the recording elements, including a recording strip 4 and the recording stylus 5. The latter is operated synchronously with scanning of detector 2 and records on the strip, the intensity, and location of radiations received by this detector. The strip 32 is advanced by suitable conventional driving mechanism at a speed so related to the speed and observation of the airplane 1 and to the viewing angle and scanning speed of the detector 2 that the scale in the direction of flight corresponds closely to the scale in the direction of scanning, giving an undistorted presentation of location of terrain radiations as illustrated (comparing record on strip 4 with the appearance of ground objects on scanned strip of terrain 6).

FIG. 3 illustrates general arrangement of one form of combined detector, scanner, and recorder elements referred to in the mention of FIGS. 1 and 2. An optical system 7 which in the illustration includes a parabolic mirror 8 with a heat detector 9, such as a bolometer, thermopile, or pneumatic heat detecting cell, is mounted at the focal point of this mirror inside an optical cylinder 10. This cylinder is held on vertical gimbals 11 in a frame 12 which in its turn is held in horizontal gimbals 13 in a frame 14, attached to a platform 15, stabilized against yaw, roll, and pitch, by gyro mechanisms 16 and 16'. Such mechanisms are known for stabilizer radar- and gun-platforms. The frame 12 supports the scanning equipment including driving motor 17, gear box 18, driving through shaft 18a, a disc 19 with a series of driving pins 20 at different radial distances. Any one of the pins 20 may carry a connecting rod 21, which through a universal pivot 22 oscillates the optical system 7 around the gimbals 11. The axis of the gimbals interesects the optical axis of system 7 preferably near the detector 9 so that this detector is subject to the minimum of translational acceleration. The optical system collects radiation through window 23, mounted on the fuselage of the airplane. The window, for the purpose of transmission of rays in the spectral region of 8 to 15 microns, should be of rock salt, silver chloride, or some other material transparent to these radiations. Radiation passing the window 23 is focused by it upon the detector 9.

Since any inequality of transparency of the window 23 would be recorded as a signal, it is advisable to place the gimbal 11 as close to this window as is mechanically possible. Such mounting avoids shadows or radiations from the gimbal. The gimbal 13 permits the optical and scanning system to be tipped for different viewing angles. It can be held at any suitable viewing angle by any convenient locking mechanism, such as a screw clamp (not shown) on the gimbal 13. The driving rod 18a carries also suitable gears 24 for driving a selsyn generator 25, which serves to synchronize the recorder to the scanner by means of selsyn motor 26. The generator 26 and motor 26 are activated by selsyn power supply 28.

The output of the detector 9 is passed through the amplifier 29, the first stage 29a of which is known as a preamplifier, may be located within the framework of the detector as shown at 30.

The recorder 31 may be of any conventional type in which a continuous strip of paper such as "Teledeltos" current sensitive paper or other recording material 32 is advanced by motor 33, the speed of which may be controlled by rheostat 34 to give a vertical scale substantially equal to horizontal scale as determined by the angle and rate of scan, angle of viewing, the speed and elevation of the airplane. In the modification illustrated, the recording needle 35 to which recording impulses are conveyed from the amplifier 29, is mounted on an arm 36 pivoted at 37 and driven by an eccentric pin 38 through a rod 39. The pin 38 is mounted on disc 39 driven by the selsyn motor 26. The pivot 37 may be located above the plane of the paper to insure straight line recording on paper 32. The selsyn mechanism can be omitted if the recorder is located adjacent the scanner. In this manner the motion of the needle relative to the paper corresponds at each instant to the motion of the scanned area relative to the ground strip over which the airplane is flying. Each dark spot on the Teledeltos paper 32 is the result of current passed through that paper in response to a signal induced by a heated spot on the ground.

By the side of the recorder 31 is located a projection device 40, in which an image is thrown on a screen from a positive photographic film, described by the name stripphotograph, of the same ground surface over which the flight is being made. The rate of advance of this stripphotograph is adjusted by speed control of the film (not shown) to correspond to the ground speed of the airplane on one scale of projection. The scale of projection can be made adjustable by means well known in the art to be substantially equal to the scale of the heat map being recorded on paper strip 32. In this way the operator can check the recording of heat map with actual ground objects as seen on the strip-photograph and use this information for navigational or bomb dropping purposes.

FIG. 4 is a diagrammatic illustration of a preferred scanning system in which all parts are fixed with the exception of a flat scanning mirror 50 and the associated driving members 52 and 53. In this system, the axis of oscillation of the scanning mirror 50 is within or parallel to the median plane of the aircraft and is tilted forward by an angle of from 10 to 50°, which is adjustable by means not indicated in the drawing. An infra-red window 54, which is parallel to the axes of oscillation 55 and 56, faces down and forwards with respect to the aircraft motion. Tracing back the path of infra-red rays detected by the sensitive area 57 of detector 58 as though this detector were a source of light indicates that these rays are rendered parallel by parabolic mirror 59 and are projected forwards and downwards after reflexion by mirror 50 and passage though window 54. The oscillation of mirror 50 causes the bundle of parallel rays to sweep the ground to the right and to the left, as the aircraft proceeds, which means, conversely, that ground areas to the right and to the left of the plane are successively scanned by the means indicated. The axis of oscillation of the mirror can be either at 55 or 56. The advantage of the 56 location, which is symmetrical to 55 with respect to window 54, is that the same portion of the window is used for all positions of the mirror 50 thereby eliminating any false indications resulting from thermal heterogeneity of the window 54. The location 55 produces a mechanically simpler arrangement of parts because of the nature of this location.

The invention claimed is:

1. An automatic mapping device comprising a scanning device on an aircraft for optically scanning at substantially right angles to the direction of movement of said aircraft, a radiation detector sensitive to infra-red rays, arranged to receive signals through the scanning device and means for interpreting the signals received by said detector to record permanently the intensity of received radiation with reference to spatial displacements of the scanning direction.

2. In a mapping device for mounting in an aircraft, an infra-red radiation detector, an optical system associated therewith for collimating radiation for said detector, a scanning device for gathering infra-red radiation continuously from the right and left of the line of advance of said aircraft, electrical means for converting the signals observed by said radiation detector to mechanical impulses, electromechanical means to advance a strip of paper and to synchronize its rate of progress with the speed of the scanning device and means for continuously converting to mechanical impulses the signals received by said detector and thereby printing a record upon said moving strip of paper.

3. In a mapping device for mounting in an aircraft, an infra-red radiation detector, an optical system associated therewith for collimating radiation for said detector, a scanning device for gathering infra-red radiation continuously from the right and left of the line of advance of said aircraft, electrical means for converting the signals observed by said radiation detector into recording impulses, means to advance a strip of recording material, means to shift one recording point to right and left of said advance, said latter means being synchronized with the speed of the scanning device and means for continuously recording said impulses due to the signals received by said detector and thereby printing a record upon said moving strip.

4. In a mapping device to be mounted in an aircraft, an infra-red transmitting parabolic mirror, a heat sensitive element mounted at the focus of said mirror, a stabilized platform supporting said assembly, means for oscillating said mirror and sensitive element to left and right of the direction of progress of the aircraft, means for traversing a sensitive strip in synchronism with the speed of oscillation of the mirror, means including a selsyndriven stylus for converting the signals received by the heat sensitive element to recording impulses whereby said stylus is made to print indicia on said strip indicative of the nature of the terrain over which the aircraft flies.

5. In a mapping device for mounting in an aircraft, an infra-red radiation detector, a parabolic mirror for collimating radiation for said detector, a plane mirror adapted to deliver infra-red radiation to said parabolic mirror, means for oscillating said plane mirror, an infrared transparent window adapted to deliver infra-red radiation to said plane mirror, the latter having an opening through which radiation from said parabolic mirror may be directed onto the sensitive area of said detector through all positions occupied by said plane mirror during the oscillation thereof.

References Cited in the file of this patent

UNITED STATES PATENTS

| | | |
|---|---|---|
| 2,151,549 | Becker | Mar. 21, 1939 |
| 2,237,440 | Jones | Apr. 8, 1941 |
| 2,262,942 | Jones | Nov. 18, 1941 |
| 2,306,656 | Wald | Dec. 29, 1942 |
| 2,403,562 | Smith | July 9, 1946 |
| 2,410,317 | Tolson | Oct. 29, 1946 |
| 2,419,024 | Iams | Apr. 15, 1947 |
| 2,420,029 | Brady | May 6, 1947 |
| 2,426,189 | Espenschied | Aug. 26, 1947 |
| 2,428,427 | Longhren | Oct. 7, 1947 |

OTHER REFERENCES

Proceedings IRE June 1946, pages 375–401.

RCA Review, vol. VII No. 3, Sept. 1946, pages 338 to 357.